US008526352B2

(12) United States Patent  (10) Patent No.: US 8,526,352 B2
Murphy et al.  (45) Date of Patent: Sep. 3, 2013

(54) METHOD OF CONTROLLING AN ENTITY OF A REMOTE NETWORK FROM A LOCAL NETWORK

(75) Inventors: Vincent Murphy, La Madeleine (FR); Roberto Agro, Montrouge (FR)

(73) Assignee: France Telecom, Paris (FR)

( * ) Notice: Subject to any disclaimer, the term of this patent is extended or adjusted under 35 U.S.C. 154(b) by 301 days.

(21) Appl. No.: 12/827,246

(22) Filed: Jun. 30, 2010

(65) Prior Publication Data

US 2010/0329173 A1 Dec. 30, 2010

(30) Foreign Application Priority Data

Jun. 30, 2009 (FR) ...................................... 09 54477

(51) Int. Cl.
*H04H 20/71* (2008.01)
(52) U.S. Cl.
USPC .......................................... 370/312; 370/310
(58) Field of Classification Search
USPC .......................................... 370/313, 312, 310
See application file for complete search history.

(56) References Cited

U.S. PATENT DOCUMENTS

| 7,739,327 | B2 * | 6/2010 | Mutton et al. | 709/203 |
| 8,176,140 | B2 * | 5/2012 | Jin et al. | 709/208 |
| 2003/0105854 | A1 | 6/2003 | Thorsteinsson et al. | |
| 2006/0031459 | A1 * | 2/2006 | Ahn et al. | 709/224 |
| 2007/0071012 | A1 * | 3/2007 | Park et al. | 370/395.53 |
| 2007/0174428 | A1 | 7/2007 | Lev Ran et al. | |
| 2008/0104249 | A1 * | 5/2008 | Oh et al. | 709/226 |
| 2008/0214241 | A1 * | 9/2008 | Hiltunen et al. | 455/558 |
| 2009/0150975 | A1 * | 6/2009 | Cho et al. | 726/3 |
| 2010/0070636 | A1 * | 3/2010 | Skog et al. | 709/228 |

FOREIGN PATENT DOCUMENTS

EP 2003853 A1 12/2008

OTHER PUBLICATIONS

French Search Report and Written Opinion dated Apr. 26, 2010 for corresponding French Application No. 09 54477, filed Jun. 30, 2009.

* cited by examiner

*Primary Examiner* — Ricky Ngo
*Assistant Examiner* — Dewanda Samuel
(74) *Attorney, Agent, or Firm* — David D. Brush; Westman, Champlin & Kelly, P.A.

(57) ABSTRACT

A method and apparatus are provided for controlling at least one entity of a remote source network from a local home network. The method is implemented by a relay module, termed a roaming relay module, designed so that when the module is executed by an appliance connected to the home network, the module communicates with a relay module, termed a source relay module, executed by an appliance of the source network and serves as communication relay in relation to the at least one entity. The method includes: a step of reception of a first request by the roaming relay module via a control interface, complying with a first protocol usable to control the entity from the source network; and a step of sending from the roaming relay module to the source relay module, a second request intended to be converted by the source relay module into at least one third request complying with the first protocol.

14 Claims, 2 Drawing Sheets

METHOD OF CONTROLLING AN ENTITY OF A REMOTE NETWORK FROM A LOCAL NETWORK

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure relates to the field of telecommunications and more particularly to a method of controlling an entity of a remote network from a local network.

BACKGROUND OF THE DISCLOSURE

Various technologies make it possible to establish a connection from one network to another, for example for the purpose of controlling an entity of a remote network from a local network. For example, VPN (Virtual Private Network) secure tunnels. Another commonly used solution consists in calling upon an IMS (IP Multimedia Subsystem) architecture.

In the field of domestic networks, the UPnP protocol is emerging as a standard for the sharing, broadcasting and monitoring of digital contents. Today, various appliances complying with the UPnP (Universal Plug and Play) standard are spreading throughout homes, and in particular in the field of multimedia with Media Servers (called for example PVConnect, Windows Media Player 11, etc.), Media Renderers (STB, DMA audio, IP-Radio, etc.), and Media Players (games consoles, digital photo frames, etc.). However, the appliances of a UPnP network are not designed to communicate with an appliance of another UPnP network. Indeed, the UPnP entity discovery mechanism sends a command in "multicast" mode which only makes it possible to discover entities present in a local network.

The existing VPN tunnel or IMS architecture based solutions are for their part relatively unwieldy and complex to implement. Furthermore, with VPN tunnel based solutions, address conflict problems arise. IMS architectures are not necessarily made freely available to users belonging to the general public.

It is thus apparent that there is a requirement for a simple solution for connecting two networks, allowing the control of an entity of a remote network from a local network and which is applicable for placing a UPnP appliance of one network in communication with an appliance of another UPnP network.

SUMMARY

A first aspect of the disclosure relates to a method of controlling at least one entity of a remote source network from a local home network, the method being implemented by a relay module, termed a roaming relay module, designed so as, when it is executed by an appliance connected to the home network, to communicate with a relay module, termed a source relay module, executed by an appliance of the source network and serving as communication relay in relation to the at least one entity, the method comprising a step of reception by the roaming relay module via a control interface, complying with a first protocol usable to control the entity from the source network, of a first request, a step of sending from the roaming relay module to the source relay module, of a second request intended to be converted by the source relay module into at least one third request complying with the first protocol.

This disclosure proposes a method allowing a user to easily control an entity—for example a UPnP entity—of a remote network from a terminal of a local network, this entity being for example a UPnP content server. This user can thus access all of his contents from the local domestic network of a friend or member of his family, and restore these contents by the terminal of the local network.

The roaming relay module exhibits a control interface complying with the protocol usable to control the entity from the source network and is furthermore capable of sending to the source relay module requests intended for the remote entity in the source network. It can therefore represent this entity in the home network via this control interface.

Finally, the presence of the two cooperating relay modules therefore allows a dialogue, complying with the first protocol, of entities of the home network with one or more entities of the source network.

According to an exemplary embodiment of the method, said entity is a content server, the method comprising a step of providing an address of at least one content referenced by the contents server, the address designating, as entity from which the content may be obtained, an entity executed by an appliance of the home network, able to transmit to the source relay module a request for access to the content. Thus access requests to multimedia contents of the remote content server are automatically redirected to an entity from which said content may be obtained. No modification of the local modules that are already able to communicate with local content servers is necessary to access to such a remote content.

According to an embodiment, the method comprises a step of implementing a discovery mechanism so that the roaming relay module is recognized as contents server of the local home network. Therefore a communication between said roaming module and a local module able to communicate with content servers of the local network using said first protocol, may be established without modifying said local module. The entity of the remote network can thus be controlled in a transparent way, from user point of view, as if it was located in the local network.

According to an embodiment of the method, the second request is sent in compliance with a second protocol distinct from the first protocol. The two modules, source and roaming, can use any appropriate communication scheme to establish a communication link from the source network to the remote network.

According to another embodiment of the method, the roaming relay module is stored on a recording medium accessible from an appliance of the home network. The method thus makes it possible to access the source network from any home network.

The recording medium is for example a USB key, whose content is, after connection to a terminal of the local network, accessible from this terminal. In an extremely simple and practical manner, the user will by transporting this USB key be able to access contents of his domestic network.

According to another embodiment of the method, the recording medium furthermore comprises a connection module, termed a roaming connection module, the method furthermore comprising a step of establishment, by the roaming connection module, of a communication link with an appliance for access to the remote network, the second request being transmitted via the communication link. Thus the communication link with the home network can be established in a secure manner, in particular by a connection module authorized to access the source network and utilizing data of connection to this network.

In particular, according to yet another embodiment of the method, the recording medium is able to be connected to the terminal. In this case, to guarantee that access to the source network will be possible, the user can transport this medium containing the module or modules necessary for accessing the source network and driving the remote entity.

According to another embodiment of the method, the entity is a contents server of the remote source network, the first request being a request to obtain metadata of contents stored in the contents server. The method allows various users to share access to their contents.

Correlatively, the disclosure also relates to a data recording medium, accessible from an appliance of a local home network, for the implementation of a method of controlling at least one entity of a remote source network, the recording medium comprising a relay module, termed a roaming relay module, designed so as, when it is executed by an appliance connected to the home network, to communicate with another relay module, termed a source relay module, executed by an appliance of the source network and serving as communication relay in relation to the at least one entity, the roaming relay module being able to receive via a control interface, complying with a first protocol usable to control the entity from the source network, at least one first request and able to send to the source relay module a second request intended to be converted by the source relay module into at least one third request complying with the first protocol.

According to an embodiment, the medium furthermore comprises a connection module able to establish a communication link with an appliance for access to the source network.

According to an embodiment, data of connection to the access appliance which are intended to be used by the connection module are stored in the medium.

Correlatively, the disclosure also relates to a relay module, termed a roaming relay module, for the implementation of a method of controlling at least one entity of a remote source network from a local home network, the roaming relay module being designed so as, when it is executed by an appliance connected to the home network, to communicate with a relay module, termed a source relay module, executed by an appliance of the source network and serving as communication relay in relation to the at least one entity, the roaming relay module being able to receive via a control interface, complying with a first protocol usable to control the entity from the source network, at least one first request and able to send to the source relay module, a second request intended to be converted by the source relay module into at least one third request complying with the first protocol.

Symmetrically, the disclosure relates to a relay module, termed a source relay module, for the implementation of a method of controlling at least one entity of a remote source network from a local home network, the source relay module serving as communication relay in relation to the at least one entity and being designed so as, when it is executed by an appliance of the source network, to communicate with a relay module, termed a roaming relay module, executed by an appliance connected to the home network, able to receive via a control interface, complying with a first protocol usable to control the entity from the source network, at least one first request, the source relay module being able to receive from the roaming relay module a second request intended to be converted into a third request complying with the first protocol.

According to an embodiment, the source relay module is able, when the third request is a request to obtain metadata of contents stored in several contents servers, to aggregate the metadata received from the various contents servers in response to the third request.

According to an embodiment, the source relay module is able to adapt the contents addresses included in the received or aggregated metadata so that these addresses can be interpreted by an appliance of the home network.

According to an exemplary implementation, the various steps of the method are implemented by computer software or a program, this software comprising software instructions intended to be executed by a data processor of a device being designed to control the execution of the various steps of this method.

Consequently, the disclosure is also aimed at a program, that may be executed by a computer or by a data processor, this program comprising instructions for controlling the execution of the steps of a method such as that mentioned above.

This program can use any programming language, and be in the form of source code, object code, or code intermediate between source code and object code, such as in a partially compiled form, or in any other desirable form.

The disclosure is also aimed at an information medium readable by a computer or data processor, and comprising instructions of a program such as that mentioned above.

The information medium can be any entity or device capable of storing the program. For example, the medium can comprise a storage device, such as a ROM, for example a CD ROM or a microelectronic circuit ROM, or else a magnetic recording device, for example a diskette (floppy disk) or a hard disk.

Moreover, the information medium can be a transmissible medium such as an electrical or optical signal, which can be conveyed via an electrical or optical cable, by radio or by other means. The program can in particular be downloaded from a network of Internet type.

Alternatively, the information medium can be an integrated circuit into which the program is incorporated, the circuit being adapted for executing or for being used in the execution of the method in question.

According to another implementation, the method is implemented by software and/or hardware components. In this respect, the term module can correspond in this document equally well to a software component or to a hardware component or else to a programmable hardware component, with or without integrated processor.

A software component corresponds to one or more computer programs, one or more subroutines of a program, or in a more general manner to any element of a program or of a piece of software able to implement a function or a set of functions, according to what is described below for the module concerned. In the same manner, a hardware component corresponds to any element of a hardware assembly able to implement a function or a set of functions, according to what is described below for the module concerned.

BRIEF DESCRIPTION OF THE DRAWINGS

Other aims, characteristics and advantages will be apparent through the description which follows, given only by way of non-limiting example and by reference to the appended drawings in which.

DETAILED DESCRIPTION OF ILLUSTRATIVE EMBODIMENTS

An exemplary embodiment of a method and apparatus are described in greater detail in the case of their application to the remote control, from a local home network, of an entity in the form of a contents server situated in a remote source network and of a scheme for accessing the contents stored by this server.

Such a content server is for example a content server complying with the UPnP (Universal Plug and Play) standard or DLNA standard (Digital Living Network Alliance). Such a content server is called a "Digital Media Server" (DMS) in the context of the UPnP/DLNA architecture. However, the mechanism proposed by the disclosure is transposable to other protocols serving for the control of entities of a local network.

The methods and apparatus of the disclosure are also applicable to the remote control of other types of entities complying with the UPnP/DLNA standard, in particular to the control of content rendering devices, called "Digital Media Renderer" (DMR) or "Digital Media Player" (DMP), or of control devices called "Digital Media Controller" (DMC).

The UPnP/DLNA standard provides mechanisms and an architecture allowing a linkup, of peer network type, between the UPnP entities. Each UPnP entity may be physically integrated into one of the terminals of the local network or else into an appliance such as an interconnection gateway (Gateway), set-top-box (STB), router or storage server of NAS (Network Attached Storage) type, etc. The communication mechanisms provided in the UPnP standard are designed to allow interoperability between the UPnP entities. The UPnP protocol uses in particular the TCP/UDP/IP protocols (Transmission Control Protocol/User Datagram Protocol/Internet Protocol) for transporting the UPnP requests.

An entity is termed a UPnP entity if it complies with the UPnP/DLNA standard or with another equivalent or derived standard, in particular if it uses a control protocol complying with such a standard.

Figure 1:
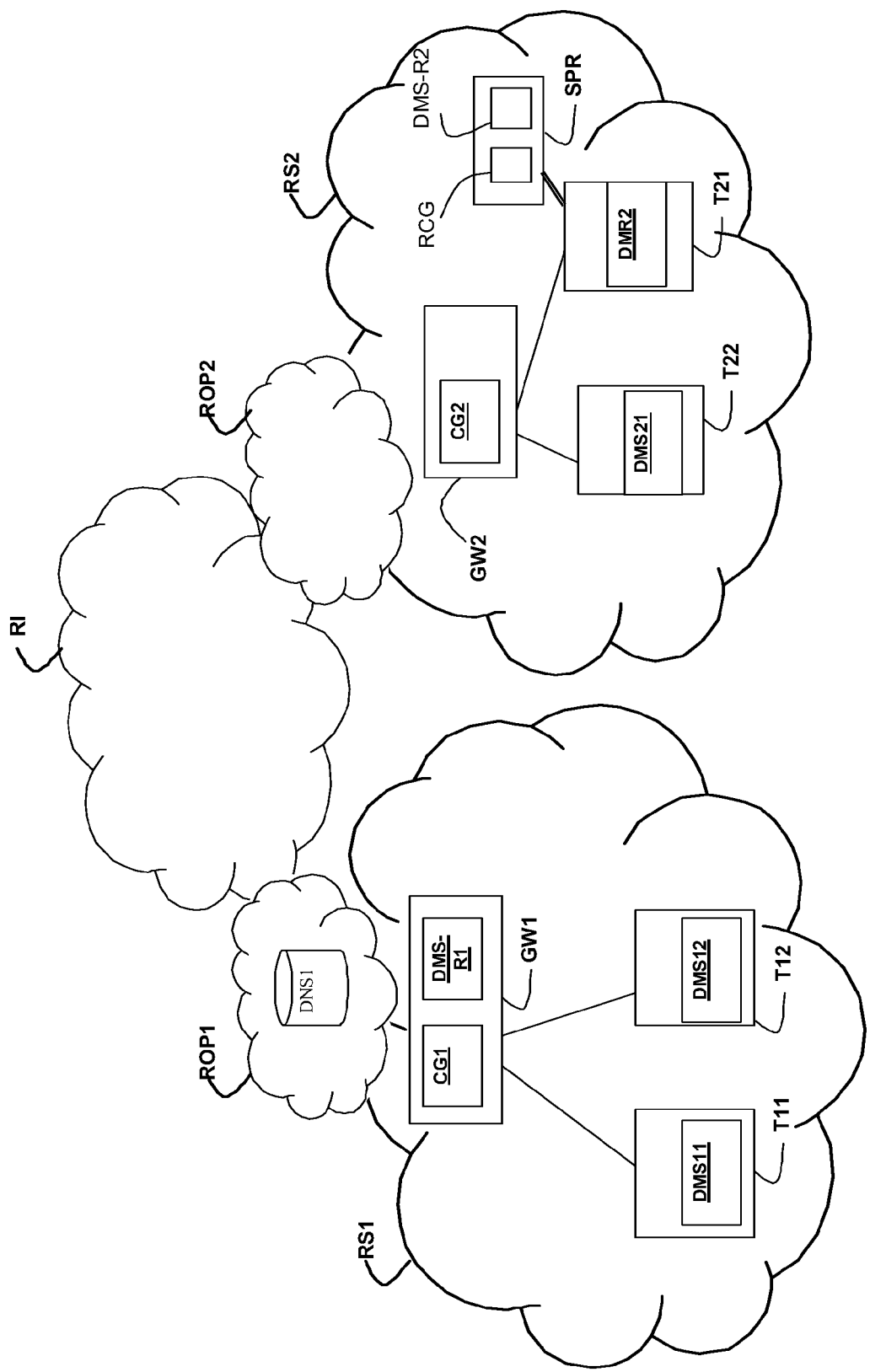
FIG. 1 represents in a schematic manner a communication system integrating a device.

The system represented in FIG. 1 is organized around, on the one hand, a first local network RS1 termed a source network, and, on the other hand, a second local network RS2, termed a home network, these two local networks being interconnected together via an extended network RI, for example the Internet network. The local networks RS1 and RS2 are for example domestic networks.

This system comprises the following entities:
a first terminal T11 of the source network RS1, hosting a contents server DMS11, complying with the UPnP standard;

a second terminal T12 of the source network RS1, hosting another contents server DMS12, complying with the UPnP standard;

a domestic gateway GW1, serving as access gateway to the source network RS1, hosting a source relay module DMS-R1, also called a source relay module and an interconnection module CG1 for access to the extended network RI;

a domain name server DNS1 (Domain Name Server, DNS) present in an operator network ROP1 of a network operator, the provider of the domestic gateway GW1, this operator network forming a network for access to the Internet network for the source network RS1;

a first terminal T21 of the home network RS2, hosting a contents rendering device DMR2 (Digital Media Renderer or Digital Media Player), complying with the UPnP standard;

a second terminal T22 of the home network RS2, hosting a contents server DMS21, complying with the UPnP standard;

a domestic gateway GW2, serving as access gateway to the home network RS2, hosting an interconnection module CG2 for access to the extended network RI;

a recording medium SPR, comprising
a roaming connection module RCG, used to establish a connection to the source network RS1 from another network and
a relay module DMS-R2 also called roaming relay module.

1. Contents Servers DMS11 and DMS12

The contents server DMS11 (or DMS12) is a contents server complying with the UPnP standard, or "Digital Media Server" (DMS). Consequently, it exhibits a control interface complying with the UPnP standard and is drivable only by UPnP requests. The sending of a UPnP request is usually carried out by a function call via a software programming interface (API, Application Programming Interface) of the destination entity.

2. Gateway GW1

The gateway GW1 is a gateway for interconnecting the source network RS1 with the Internet network RI. It allows the terminals of the source network RS1 to access the Internet network RI. Conversely, the gateway allows—with the proviso that rights for such access are granted—appliances of a network other than the source network RS1 to communicate with a terminal of the source network RS1.

The interconnection module CG1 implements the functions of interconnection between the source network RS1 and the Internet network RI. It comprises for this purpose a first communication interface for communication with the entities of the source network RS1 and a second communication interface for communication via the Internet network RI, in particular with the entities external to the source network RS1. This second interface is used to communicate with an Internet access provider (commonly called Internet Service Provider, ISP) of the operator of the network ROP, as well as with the domain name server DNS1.

The server DNS1 maintains a lookup table of correspondences between public addresses and names assigned to the appliances that it manages. In particular, the name assigned to the domestic gateway GW1 is static, that is to say does not change, but the public address of the domestic gateway GW1 changing periodically, it is necessary, in order to communicate with this domestic gateway GW1, to ascertain its current public address, and therefore to interrogate the server DNS1 on the basis of the name of the GW1. This name corresponds to the name of the network domain managed by this gateway, and is for example in the form:

myhome.homedns.org

This name can be assigned automatically by the network operator providing the domestic gateway GW1 or configured manually by a user of this gateway.

The configuration of the domain name associated with the domestic gateway GW1 is performed by the interconnection module CG1 which communicates for this purpose with the server DNS1.

The interconnection module CG1 furthermore comprises an addressing module in the form of an IGD (Internet Gateway Device) or CGI (Common Gateway Interface) UPnP device, in charge of mapping the public addresses and ports in relation to the private addresses and ports of the appliances of the source network RS1, so as to allow a device outside the source network RS1 to communicate with such an appliance of this source network RS1 by a public address and/or port. This addressing module is used in particular to allow the roaming relay module DMS-R2 to be placed in communication with the source relay module DMS-R1.

3. Source Relay Module DMS-R1

The source relay module DMS-R1 is a representative entity (or proxy entity) associated with one or more contents servers DMS11 and/or DMS12: it serves as communication intermediary between a contents server DMS11 (or DMS12) and an entity not complying with UPnP and/or not forming part of the source network. The source relay module DMS-R1 thus serves as the "representative" of the contents server DMS11 in relation to such an entity. By virtue of the presence of the source relay module DMS-R1, the contents server DMS11 is drivable remotely by an entity not complying with UPnP and/or not forming part of the source network.

More precisely, the source relay module DMS-R1 implements the functions of a UPnP control point (DMC, Digital Media Controller), in particular the functions for detecting a UPnP content server and for consulting the directory of contents (CDS, Content Directory Service) of a UPnP content server. The source relay module DMS-R1 implements two interfaces:

a first interface, complying with the UPnP protocol and corresponding to a UPnP control device interface (DMC, Digital Media Controller, also called a "UPnP control point"), for on the one hand sending UPnP commands to a UPnP entity of the source network RS1, in particular to one of the contents servers DMS11 or DMS12 and on the other hand receiving and processing the responses to these requests;

a second interface, using a protocol distinct from the UPnP protocol and appropriate for sending or receiving non-UPnP requests exchanged with a non-UPnP entity and/or an entity not forming part of the source network RS1; The protocol used here is for example the HTTP protocol.

Via this second interface, the source relay module DMS-R1 is able to dialogue with the roaming relay module DMS-R2, described in greater detail below, executing within an appliance of the home network RS2. This dialogue is performed according to an appropriate scheme, for example by calls to a remote procedure or by a request of "Web service" type, complying with a protocol chosen for example from XML-RPC, SOAP and REST. The requests exchanged between the source relay module DMS-R1 and the roaming relay module DMS-R2 are in this case transported using the HTTP protocol.

The source relay module DMS-R1 is configured to receive via its second interface requests not complying with the UPnP protocol, intended for the contents server DMS11, so as to convert these requests not complying with UPnP into requests complying with the UPnP protocol and to transmit via its first interface the requests thus converted to the contents server DMS11.

This conversion of request format is performed for example by de-encapsulation of a UPnP request, having been encapsulated in a request complying with a second protocol. This second protocol is for example the HTTP protocol. This format conversion operation does not modify the data of the converted UPnP request, but only the format used to transmit it. Note here that a request transmission complying with the UPnP protocol is generally performed through a function call of a software interface of the destination UPnP module. More precisely, in the UPnP standard, one speaks of invoking actions of a UPnP service implemented by the destination UPnP module (UPnP contents server, DMR or DMP rendering device).

An exemplary request received via the second interface is a request to obtain metadata of contents accessible from a UPnP contents server of the source network RS1. The source relay module DMS-R1 is designed to convert this request into one or more requests, dubbed "Browse" in the UPnP standard, which will be sent respectively to the various UPnP contents servers of the source network RS1.

The format conversion operated on an incoming request by the source relay module DMS-R1, is accompanied if appropriate by operations such as:

modification or filtering of the parameters of the incoming request and/or addition of new parameters to the request or requests to be sent and/or decomposition of the incoming request into one or more requests to be sent or, conversely, combination of several incoming requests into a single request to be sent.

Conversely, the source relay module DMS-R1 receives via its first interface of the contents server DMS11 responses to function call or messages, which do or do not include contents stored by this server which comply with the UPnP protocol, converts them into requests complying with another protocol, appropriate for communication with an entity not complying with UPnP and/or not forming part of the source network, and transmits via its second interface the requests thus converted to the destination entity. This conversion of request format is performed for example by encapsulating a UPnP request, in a request complying with a second protocol. This second protocol is for example the HTTP protocol. This conversion does not modify the data of the converted UPnP request, but only the format used to transmit it.

The format conversion operated at this juncture by the source relay module DMS-R1 is accompanied if appropriate by operations such as:

modification or filtering of the parameters of the incoming request and/or addition of new parameters to the request or requests to be sent and/or decomposition of the incoming request into one or more requests to be sent or, conversely, combination of several incoming requests into a single request to be sent.

Via its second interface, the source relay module DMS-R1 is also able to receive and retransmit HTTP requests not transporting any request of "Web service" type. These involve, in particular, requests for transmitting contents or a request for obtaining content not requiring any conversion to a UPnP request or response.

The source relay module DMS-R1 thus serves as representative of the contents server DMS11 (or DMS12) for the sending (respectively the reception) of requests that this server is not itself able to send (respectively receive).

The source relay module DMS-R1 is integrated into the domestic gateway GW1 or into another appliance of the source network RS1. It is of course conceivable, however, that the various functions of this module be implemented in a distributed manner, that is to say in distinct physical appliances, with the proviso that a communication link be provided between the entities respectively implementing each of these functions.

When the source relay module DMS-R1 is not integrated into the domestic gateway GW1, the source relay module DMS-R1 is designed to send addressing data to the addressing module of the interconnection module CG1 so that this addressing module can route to the source relay module DMS-R1 the requests which are intended for it. For this purpose, the source relay module DMS-R1 transmits to the addressing module of the interconnection module CG1 a port number and an IP address by means of which the source relay module DMS-R1 may be contacted. This port number and IP address are stored in correspondence with the domain name associated with the domestic gateway GW1 and a public port number assigned to the source relay module DMS-R1.

When the source relay module DMS-R1 is integrated into the domestic gateway GW1 no addressing device is necessary in the domestic gateway GW1 for contacting the source relay module DMS-R1 from an appliance external to the source network RS1.

In addition to the conversions of request format from the UPnP protocol to another remote control protocol used between the relay modules DMS-R1 and DMS-R2 or vice-versa, the source relay module DMS-R1 implements a function for translating the addresses of contents stored by the contents servers DMS11 or DMS12 of the source network RS1.

This enables the contents of the source network RS1 to be made accessible from the home network RS2. The addresses used are generally in the form of a URI (Uniform Resource Identifier) address, for example http://192.168.1.10:9000/dlna/objectID=1234

The address translation operated by the source relay module DMS-R1 is dubbed "source translation". It consists in replacing, in the URI address of a content, the IP address and the port of the content server in which this content is stored, with the public domain name of the domestic gateway GW1 and the public port number assigned to the source relay module DMS-R1, in such a way that the URI address after translation is adapted for access to this content via the source relay module DMS-R1 and via the domestic gateway GW1, from an entity outside the source network RS1, in particular from the roaming relay module DMS-R2 executing in an appliance of a home network RS2 which will be described further on.

The URI addresses after translation by the source relay module DMS-R1 will therefore be in the form:

http://GW1_DNS:GW1_PORT/
download?uri=CONTENT_URI where:

CONTENT_URI is the URI original address of the content, this address usually comprising the local IP address of the contents server which stores this content as well as data identifying the content proper, for example in the form http://192.168.1.10:9000/dlna/objectID=1234;

GW1_IP is a domain name or a static public IP address assigned to the domestic gateway GW1;

GW1_PORT is the domestic gateway GW1 port via which the source relay module DMS-R1 can be addressed.

The URI address thus modified therefore designates the source relay module DMS-R1 as contents server referencing the content, that is to say as the entity from which the content may be obtained.

Such address translation is necessary in order to avoid possible conflicts with contents servers or contents originating from another network, in particular with those of the home network RS2. It is operated on the URI addresses contained in requests sent by the source relay module DMS-R1 destined for the home network RS2.

This address translation operation may be operated by the source relay module DMS-R1, in so far as the latter knows the parameters GW1_IP and GW1_PORT.

The inverse transformation, consisting in extracting the URI addresses before transformation, is operated when a request, sent from the home network RS2, reaches the source relay module DMS-R1. This inverse transformation therefore makes it possible to restore the original address CONTENT_URI, that is to say the address as provided by the contents server referencing this content.

The source relay module DMS-R1 is furthermore designed to collect and aggregate the contents metadata associated with contents stored by various contents servers DMS11 or DMS12 of the source network RS1. When these metadata comprise URI addresses of contents, a translation of these addresses is operated before or after aggregation by the source relay module DMS-R1 according to what has just been described, by applying the "source translation" function. The metadata thus modified are transmitted to the roaming relay module DMS-R2.

4. Gateway GW2

The gateway GW2 is a gateway for interconnecting the source network RS2 with the Internet network RI. It allows the terminals of the source network RS2 to access the Internet network RI. Conversely, the gateway allows—with the proviso that rights for such access are granted—appliances of a network other than the source network RS2 to communicate with a terminal of the source network RS2.

The interconnection module CG2 implements the functions of interconnection between the source network RS2 and the Internet network RI. It comprises for this purpose a first communication interface for communication with the entities of the source network RS2 and a second communication interface for communication via the Internet network RI, in particular with the entities external to the source network RS2.

5. Recording Medium SPR

The recording medium is a medium suitable for storing software modules. It is a medium which is read-accessible from at least one appliance of the home network RS2, for example:

a portable and removable recording medium, able to be hooked up—by wired or non-wired link—to a terminal or another appliance (set-top-box, router, gateway, etc.) of the home network RS2 so as to be read by this terminal or this appliance: USB key, mobile telephone, removable hard disk, etc.;

a fixed recording medium, accessible from a terminal or an appliance of the home network RS2 via a communication link established through a wired or non-wired network: storage space accessible via a remote server, the modules stored on this storage space being in this case downloaded to the terminal of the home network RS before being executed by this terminal.

The roaming connection module RCG and roaming relay module DMS-R2, stored on the recording medium SPR, are stored in the form of source code, object code, or in a partially compiled form in the form of interpretable code: they are intended to be loaded into the memory of an appliance of the home network RS2 so as to be executed by a processor of such an appliance—after a possible interpretation or compilation required in order to have an executable code.

In the case where the recording medium SPR is integrated into an appliance fitted with a processor able to execute roaming connection module RCG or roaming relay module DMS-R2, the execution of one or the other of these modules can be handled by this processor. In the general case, it is assumed that a link is established between this medium and a host appliance of the home network, fitted with a processor and with memory, and that the execution of these modules is handled by the processor of the host appliance.

Preferably, the recording medium SPR will be a secure-access medium so that only authorized users can access the content of this medium: a password, PIN code or any other authentication datum will be required for access to the content stored on this medium.

6. Roaming Connection Module RCG

The roaming connection module RCG is intended to be executed by an appliance connected to the home network RS2. For this purpose, it is stored on the recording medium SPR, accessible from at least one appliance of the home network RS2. In so far as the roaming connection module RCG may be used in various home networks, this module has been dubbed a roaming connection module.

The roaming connection module RCG is designed to establish, via the interconnection module CG2 of the gateway GW2, a communication link with the interconnection module CG1 of the gateway GW1 of the source network RS1.

The roaming connection module RCG communicates with this interconnection module CG1 for example by HTTP requests transmitted via such a link. For security reasons, it is preferable, however, that the roaming connection module RCG uses the HTTPS protocol—or any other secure protocol—to communicate with the interconnection module CG1. Optionally, provision is made for authentication of the roaming connection module RCG, by:

either data for authenticating the roaming connection module RCG, stored on the recording medium SPR, or data for authenticating a user, obtained from this user following initialization of the connection between the recording medium SPR and a terminal T21 or T22 of the home network RS2.

The use of the HTTPS protocol implies that the HTTP requests received by the roaming connection module RCG are encapsulated in requests complying with the HTTPS protocol and transmitted in this form to the interconnection module CG1. Conversely, on receipt of an HTTPS request originating from the interconnection module CG1, the roaming connection module RCG de-encapsulates this request so as to generate a request complying with the HTTP protocol, and then transmits it to the roaming relay module DMS-R2 which will be described below.

As an alternative to the use of a secure protocol such as HTTPS, it is also conceivable, in order to secure the link between the roaming connection module RCG and the interconnection module CG1, to undertake the establishment of a secure tunnel (VPN, Virtual Private Networking).

The roaming relay module DMS-R2 is designed so that all the communications established with an entity of the source network RS1 travel through the roaming connection module RCG and the interconnection module CG1, and use the secure communication link established between the roaming connection module RCG and the interconnection module CG1. This is what allows the exchanges with this source network to be made secure.

Preferably, the roaming connection module RCG establishes, as soon as it is initialized, a secure communication link with the CG1, this link being used for all the exchanges between the roaming relay module DMS-R2 and an entity of the source network.

Furthermore, in the case where a communication proxy is used for accessing the home network RS2, the roaming connection module is designed to determine the network parameters necessary to establish an outbound communication from the home network RS2, on the basis of the network parameters defined in the host appliance executing the roaming connection module RCG.

7. Roaming Relay Module DMS-R2

The roaming relay module DMS-R2 is intended to be executed by an appliance connected to the home network RS2. For this purpose, it is stored on the recording medium SPR, accessible from at least one appliance of the home network RS2. In so far as the roaming relay module DMS-R2 may be used in various home networks, it will be dubbed a roaming relay module.

The roaming relay module DMS-R2 is designed to cooperate with the source relay module DMS-R1 with a view to linking up UPnP entities of the home network RS2 with one or more entities of the source network RS1. Just like the source relay module DMS-R1, the roaming relay module DMS-R2 exhibits a first UPnP-compliant communication interface and a second non-UPnP communication interface.

The first interface, complying with the UPnP protocol, corresponds to a software interface of a UPnP contents server (DMS, Digital Media Server), for on the one hand receiving UPnP requests originating from a UPnP entity of the home network RS2, and on the other hand receiving and processing the responses to these requests. This interface allows in particular the activation of functions of the services defined in the UPnP standard for a UPnP contents server.

Furthermore, the roaming relay module DMS-R2 implements the functions provided in the discovery mechanism of the UPnP standard so as to be recognized in the guise of local UPnP contents server and thus receive via its first interface the UPnP requests intended for at least one of the UPnP contents servers of the source network RS1.

For this purpose, the roaming relay module DMS-R2 declares capabilities which are those of the UPnP contents servers of the source network RS1, that is to say the "services"—in the sense of the UPnP standard—afforded by these servers.

In a known manner, the discovery protocol provided for in the UPnP standard proceeds as follows. When the roaming relay module DMS-R2 is initialized and connects to the network RS2, it signals itself to the UPnP devices of this network by sending a message M1 indicating its presence. Such a message M1 is usually a message 'alive' complying with the SSDP protocol (Simple Service Discovery Protocol). For the definition of these messages, reference may for example be made to the document called "draft-cai-ssdp-v1-02" from the IETF ('Internet Engineering Task Force'). This message M1 is broadcasted in the network in multicast mode. Therefore, it is received by the rendering device DMR2 or by any UPnP "Control point" that might be located in the network RS2. Thus, for the UPnP entities of the network RS2, everything happens as if this roaming relay module DMS-R2 was actually a UPnP contents server, located in this network RS2.

The second interface uses a distinct protocol from the UPnP protocol and appropriate for sending or receiving non- UPnP requests exchanged with an entity not forming part of the home network RS2. The protocol used here is for example the HTTP protocol.

Via its second interface the roaming relay module DMS-R2 is able also to receive and retransmit HTTP requests not transporting any request of "Web service" type. These are, in particular, requests to transmit contents or a request to obtain content not requiring any conversion to a UPnP request or response.

For security reasons, the roaming relay module DMS-R2 communicates with the source relay module DMS-R1 by way of the roaming connection module RCG.

Just like the source relay module DMS-R1, the roaming relay module DMS-R2 implements a function for translating the contents addresses provided by the source relay module DMS-R1. This allows the contents of the source network RS1 to be made accessible from the home network RS2 via the relay modules DMS-R1 and DMS-R2.

The address translation operated by the roaming relay module DMS-R2 is dubbed "roaming translation". It consists in replacing in the URI address of a content, the IP address and the port of the server designated in this address—that is to say of the entity from which the content can be obtained—with the IP address and the port of the roaming connection module RCG. This IP address is in fact the address of the appliance of the home network RS2 which executes the roaming connection module RCG and roaming relay module DMS-R2, the port being a communication port assigned to the roaming connection module RCG.

As an alternative, instead of designating the roaming connection module RCG, the translated URI address designates the roaming relay module DMS-R2. The roles of the roaming connection module RCG and of the roaming relay module DMS-R2 are in effect interchangeable regarding the translation of the addresses and the interception/processing of the access requests containing these translated addresses.

Whichever alternative is chosen, it is only required that the entity designated in the translated URI address be able to communicate with the source relay module DMS-R1, the recipient destination for the content access requests which may be sent from the home network RS2.

The URI addresses after translation by the roaming relay module DMS-R2 will therefore be in the form:
   http://RCG_IP:RCG_PORT/
download?uri=CONTENT_URI_R1
   where:
   CONTENT_URI_R1 is the URI address as provided by the source relay module DMS-R1,
   RCG_IP is the IP address of the roaming connection module RCG,
   RCG_PORT is the port of the roaming connection module RCG.

The URI address thus modified therefore designates the roaming connection module RCG as contents server referencing the content, that is to say as the entity from which the relevant content may be obtained.

This address translation is operated on the URI addresses contained in requests originating from the source relay module DMS-R1 and reaching the roaming relay module DMS-R2.

The inverse transformation, consisting in extracting the URI addresses such as they were before the "roaming translation"—that is to say in extracting the address CONTENT_URI_R1 as provided by the source relay module—is operated on the URI addresses contained in a request sent from the home network RS2, reaching the source relay module DMS-R2 or the roaming connection module RCG and needing to be transferred to the source relay module DMS-R1. This inverse operation is performed either by the source relay module DMS-R2, or by the roaming connection module RCG.

Figure 2:
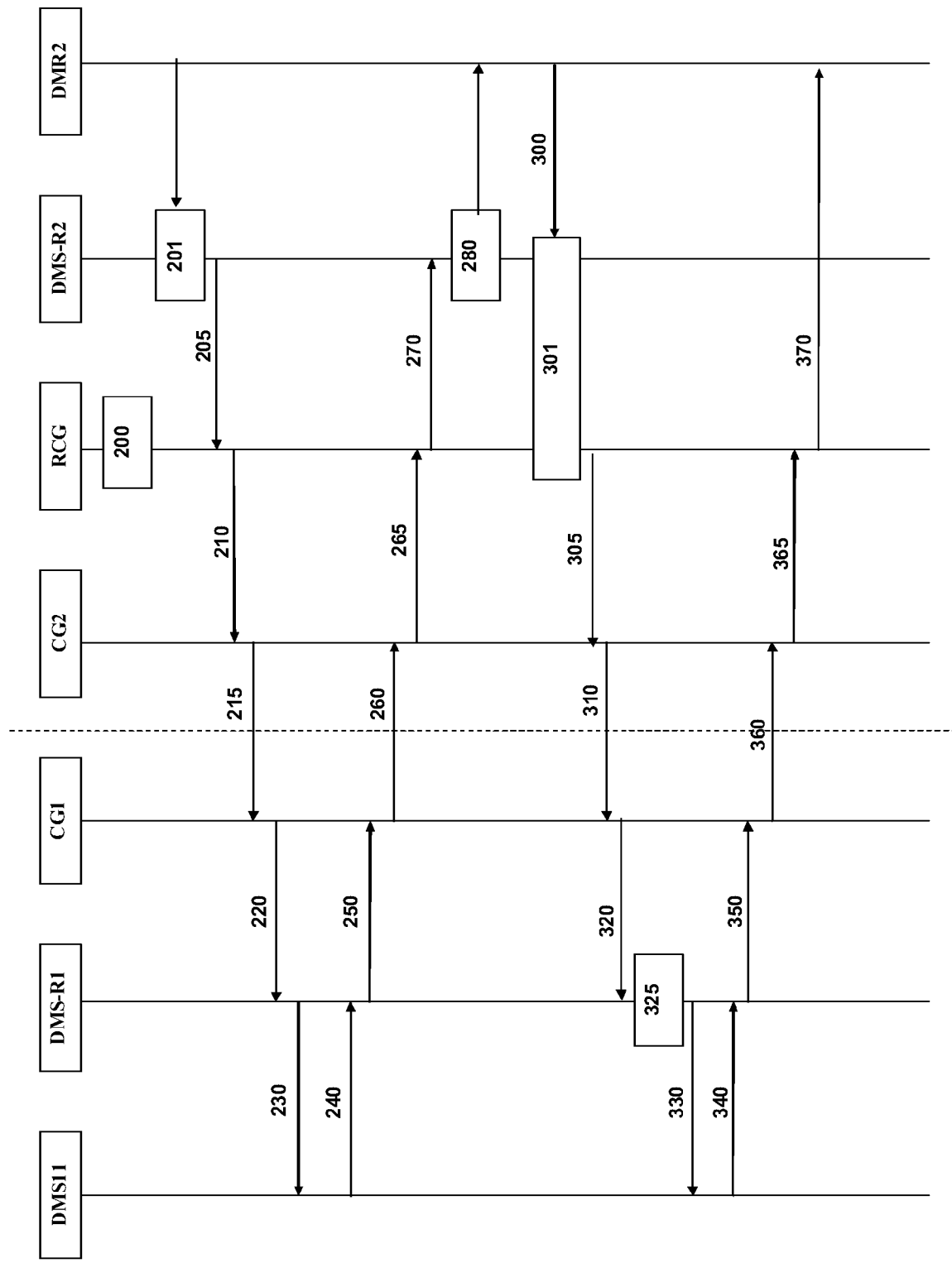
FIG. 2 represents a flowchart of an embodiment of the method.

An embodiment of the method is now described by reference in FIG. 2. This method comprises steps 200 to 340. This set of steps may be executed any number of times, each time that an access to a content of the source network RS1 from an appliance of the home network RS2 is desired.

Step 200 is an initialization step. During this step, a user connects the recording medium SPR to a host terminal, the terminal T21 for example. After connection, the execution of the roaming connection module RCG is triggered automatically by a processor of the host terminal T21.

The user is invited to provide authentication data, for example an identifier and password. The roaming connection module sends a request for connection to the interconnection module CG1 of the source network RS1, comprising the authentication data provided by the user. In the case of successful authentication, a secure communication link is established between the roaming connection module RCG and the interconnection module CG1 and the following step 201 is executed. In the converse case, an error message is presented to the user and the method terminates. If appropriate, the user is invited to enter new authentication data.

In step 200, the execution of the roaming relay module DMS-R2 is triggered automatically by the processor of the host terminal T21. The roaming relay module DMS-R2 advises, in compliance with the UPnP discovery mechanism, the UPnP control points (Digital Media Controller) of the home network RS2 of its presence and of its capabilities: it is then seen as a local UPnP contents server. In this instance, the roaming relay module DMS-R2 presents with capabilities which are those of the UPnP contents servers of the source network RS1 that it represents.

In step 201, a UPnP request, dubbed "Browse", for obtaining metadata of contents of the contents servers of the source network RS1 is sent by a UPnP rendering device, for example by the rendering device DMR2, located in the terminal T21, and is received by the roaming relay module DMS-R2. This request triggers a procedure for obtaining metadata, corresponding to the following steps 205 to 280. As an alternative, this same procedure for obtaining metadata could be triggered automatically, without a "Browse" request being received from a rendering device DMR2 or from a UPnP control point: either on the initialization of the roaming relay module DMS-R2, or periodically.

The "Browse" UPnP request is converted into another request, able to be transmitted to the source relay module DMS-R1. The sending of this other request uses the communication scheme chosen for the dialogue between the relay modules DMS-R1 and DMS-R2. This other request is in this case transported using the HTTP protocol. It is assumed in the subsequent description that the relay modules DMS-R1 and DMS-R2 communicate with one another by request of Web service type.

In step 205, this HTTP request to obtain metadata, is intercepted by the roaming connection module RCG which encapsulates it in an HTTPS request.

In step 210, the encapsulated HTTPS request to obtain metadata is transmitted by the roaming connection module RCG through the secure link established in step 200 and reaches the interconnection module CG1.

In step 220, the encapsulated HTTPS request to obtain metadata is de-encapsulated by the interconnection module CG1, and then transmitted in the form of an HTTP request to the source relay module DMS-R1.

In step 230, the HTTP request to obtain metadata reaches the source relay module DMS-R1 which de-encapsulates it. The de-encapsulated request is therefore a "Browse" UPnP request identical to the obtain metadata UPnP request sent in step 201 by the rendering device DMR2. The source relay module DMS-R1 thereafter processes this request: the processing operated consists in sending the UPnP contents servers of the network a UPnP request to obtain the metadata of the contents accessible respectively via each of these content servers. In this instance, a UPnP request dubbed "Browse" is sent to each of the contents servers DMS11 and DMS12.

In step 240, on receipt of the UPnP responses of the contents servers DMS11 and DMS12, the source relay module DMS-R1 aggregates the metadata received from the various contents servers DMS11 or DMS12 of the source network RS1. The source relay module DMS-R1 performs, according to what was described above for this module, a translation ("source translation") of the contents URI addresses contained in these metadata, in such a way that these addresses are usable by a UPnP module of the home network RS2. In this instance, having regard to the nature of this translation, these translated addresses all designate the source relay module DMS-R1 as entity from which these contents can be obtained.

In step 250, the source relay module DMS-R1 generates a response request in answer to the request received in step 220, according to the same protocol or the same scheme as that used in sending this request, that is to say by request of "Web service" type. This response request is in this case transported in compliance with the HTTP protocol. It comprises the metadata as aggregated and modified in step 240.

In step 260, the HTTP response request, generated in step 250, is received by the interconnection module CG1 which encapsulates it in a request complying with the HTTPS protocol before transmitting it via the secure communication link established with the roaming connection module RCG.

In step 270, the HTTPS response request reaches the roaming connection module RCG which de-encapsulates it, and then sends the de-encapsulated response request, in the form of an HTTP request, to the roaming relay module DMS-R2.

In step 280, the roaming relay module DMS-R2 processes the HTTP response request received. It performs, according to what was described above for this module, a translation ("roaming translation") of the contents URI addresses contained in these metadata, in such a way that these addresses are usable by a UPnP module of the home network RS2 only by passing through the roaming relay module DMS-R2 and the associated roaming connection module RCG. In this instance, having regard to the nature of this translation, these translated addresses all designate the roaming connection module RCG as entity from which these contents can be obtained.

Next, the roaming relay module DMS-R2 records the metadata received in a memory or a data file, for example on the recording medium SPR. This file forms a database for storing metadata.

In response to the UPnP request, dubbed "Browse", to obtain contents metadata, the roaming relay module DMS-R2 transmits the requested metadata to the rendering device DMR2.

The roaming relay module DMS-R2 provides in the metadata transmitted, for each content referenced by a contents server of the source network, an address designating as entity from which the relevant content may be obtained, an entity (the roaming connection module RCG or, alternatively, the roaming relay module DMS-R2) executed by an appliance of the home network RS2, this entity being able to transmit a request for access to the content to the source relay module DMS-R1.

In step 300, subsequent to a consultation by a user of the metadata stored by the roaming relay module DMS-R2 and a selection performed by this user of a content to be restored, a request to obtain one of the contents, selected on the basis of these metadata, is sent by UPnP rendering device, for example by the rendering device DMR2 located in the terminal T21. This obtain content request is a request of "GET" type, complying with the HTTP protocol. In compliance with the UPnP standard, this request contains a URI address of the content to be restored. Because the URI addresses contained in the metadata provided by the roaming relay module DMS-R2 have undergone a translation, this URI address designates the roaming connection module RCG as the entity from which the relevant content may be obtained. As an alternative, it designates the roaming relay module DMS-R2.

In step 301, the HTTP request to obtain content "GET" is received by the entity designated in the URI address: either by the roaming connection module RCG, or by the roaming relay module DMS-R2, depending on the alternative chosen.

The designated entity (the roaming connection module RCG or, alternatively, the roaming relay module DMS-R2) extracts from the URI address received the URI address, such as generated in step 240 by the source relay module DMS-R1 during the transfer of the metadata: this time, the extracted address designates the source relay module DMS-R1 as entity from which the relevant content can be obtained.

The roaming connection module RCG or, alternatively, the roaming relay module DMS-R2, thereafter generates an HTTP request "GET", containing the URI address extracted and then transmits it to the source relay module DMS-R1.

Next, the HTTP request to obtain content "GET" is encapsulated by the roaming connection module RCG in an HTTPS request.

In step 305, the encapsulated HTTPS request to obtain content is transmitted by the roaming connection module RCG through the secure link established in step 200 and reaches the interconnection module CG2.

In step 310, the encapsulated HTTPS request to obtain content is transmitted by the interconnection module CG2 through the secure link established in step 200 and reaches the interconnection module CG1.

In step 320, the encapsulated restore HTTPS request is de-encapsulated by the interconnection module CG1, and then transmitted in the form of an HTTP request "GET" to the source relay module DMS-R1.

In step 325, the HTTP request to obtain content "GET" is received by the source relay module DMS-R1 which extracts from the URI address received the URI address obtained in step 240 by the source relay module DMS-R1 during the transfer of the metadata: this time, the extracted address designates the content server DMS11 as entity from which the relevant content can be obtained.

The source relay module DMS-R1 thereafter generates an HTTP request "GET", containing the URI address extracted and then transmits it to the content server DMS11.

In step 330, the restore HTTP request "GET" reaches the source relay module DMS-R1 which processes it: it extracts the content's original URI address, such as provided by the server of the content to be transferred, and then generates an HTTP request "GET", containing this original address. The source relay module DMS-R1 thereafter sends the HTTP request "GET" thus constructed to the content server storing the content to be restored. This server is identified on the basis of the URI address contained in the request, that is to say of the field "CONTENT_URI" which has survived the various address translations. In this instance, the HTTP request "GET" is sent to one of the contents servers DMS11 and DMS12, for example to the contents server DMS11.

In step 340, after receipt of the HTTP request "GET", the contents server DMS11 sends the data of the content to be restored to the source relay module DMS-R1. These content data are sent in the form of data packets transmitted by the HTTP protocol.

In step 350, the source relay module DMS-R1 sends the HTTP packets received to the roaming relay module DMS-R2.

In step 360, these HTTP packets are received by the interconnection module CG1 which encapsulates them in data packets complying with the HTTPS protocol before transmitting them via the secure communication link established with the roaming connection module RCG.

In step 370, the HTTPS packets reach the roaming connection module RCG which de-encapsulates them, and then sends the de-encapsulated packets, in the form of HTTP packets, directly to the rendering device DMR2, without passing through the roaming relay module DMS-R2.

In step 380, the rendering device DMR2 restores the content selected on the basis of the HTTP packets received.

It should be noted that the conveying of the HTTP requests "GET" could be carried out without passing through the roaming relay module DMS-R2, these requests possibly being addressed directly to the source relay module DMS-R1, and/or not passing through the roaming connection module if no security constraint so imposes.

The role of the roaming relay module is used mainly to exhibit a control interface, complying with the protocol which is used to control the remote entity in the source network: this roaming relay module therefore serves as representative, in the home network, of the remote entity to be controlled (in this instance the contents servers DMS11 and DMS12). In association with the roaming connection module RCG, the roaming relay module DMS-R2 serves as communication relay in relation to the source relay module.

It should be noted that the roaming relay module and the roaming connection module are described here as being two independent modules so as to identify the various functions useful for an exemplary implementation. However, they can be integrated within one and the same software module or one and the same program, stored on the recording medium SPR.

It should be noted that, both the source relay module and the roaming relay module can represent several remote entities (in this instance several contents servers DMS11 and DMS12).

By virtue of one or more examples described herein, and of the recording medium, for example, a user Bob can access contents stored in his domestic network from a terminal of another user Alice, hooked up to another domestic network. Thus Bob can share contents with Alice, in particular by requesting a restore of these contents on a terminal of Alice's, this being so even though Bob and Alice's domestic networks are geographically dissociated and not interconnected.

Although the present disclosure has been described with reference to one or more examples, workers skilled in the art will recognize that changes may be made in form and detail without departing from the scope of the disclosure and/or the appended claims.

What is claimed is:

1. A method of controlling at least one entity of a remote source network from a local network, the method comprising:
a step of executing by an appliance connected to the local network, a software module integrating a roaming relay module, which is configured to communicate with a source relay module, executed by an appliance of the remote network and serves as a communication relay in relation to the at least one entity;
a step of implementing a discovery mechanism during which the roaming relay module is recognized as a contents server of the local network,
a step of reception by the roaming relay module via a control interface, complying with a first protocol usable to control the entity from the remote network, of a first request, and
a step of sending from the roaming relay module to the source relay module a second request to be converted by the source relay module into at least one third request complying with the first protocol.

2. The method according to claim 1, in which the entity comprises a content server, the method comprising a step of providing an address of at least one content referenced by the content server, the address designating, as an entity from which the content may be obtained, an entity executed by an appliance of the local network, able to transmit to the source relay module a request for access to the content.

3. The method according to claim 1, in which the second request is sent in compliance with a second protocol distinct from the first protocol.

4. The method according to claim 1, in which the software module integrating the roaming relay module is stored on a recording medium accessible from an appliance of the local network.

5. The method according to claim 4, in which the software module furthermore comprises a roaming connection module, the method furthermore comprising a step of establishment, by the roaming connection module, of a communication link with the appliance for access to the remote network, the second request being transmitted via the communication link.

6. The method according to claim 4, in which the recording medium is configured to be connected to an appliance of the local network.

7. A non-transitory data recording medium, accessible from an appliance of a local network, for implementation of a method of controlling at least one entity of a remote network, the recording medium storing a software module integrating a roaming relay module, wherein when the software module is executed by the appliance of the local network, the software module configures the appliance of the local network to:
communicate with a source relay module, executed by an appliance of the remote network and serves as communication relay in relation to the at least one entity,
implement a discovery mechanism during which the roaming relay module is recognized as a content server of the local network,
receive via a control interface, complying with a first protocol usable to control the entity from the remote network, at least one first request,
send to the source relay module a second request to be converted by the source relay module into at least one third request complying with the first protocol.

8. The non-transitory data recording medium according to claim 7, wherein the stored software module integrates a connection module configured to establish a communication link with an appliance for access to the remote network.

9. The non-transitory data recording medium according to claim 8, storing data of connection to an access appliance of the remote network, which are intended to be used by the connection module.

10. An appliance configured to be connected to a local network and comprising:
- a processor; and
- a memory storing a software module integrating a roaming relay module and comprising instructions that, when executed by the processor, configures the appliance to implement a method of controlling at least one entity of a remote network from the local network, the method comprising:
- communicating with a source relay module, executed by an appliance of the remote network and serving as communication relay in relation to the at least one entity,
- implementing a discovery mechanism during which the roaming relay module is recognized as a contents server of the local network, and
- receiving via a control interface, complying with a first protocol usable to control the entity from the remote network, at least one first request and sending to the source relay module a second request to be converted by the source relay module into at least one third request complying with the first protocol.

11. An appliance configured to be connected to a remote network and comprising:
- a processor; and
- a memory storing a software module integrating a source relay module and comprising instructions that, when executed by the processor, configures the appliance to implement a method of controlling at least one entity of the remote network from a local network, the method comprising:
- serving as a communication relay in relation to the at least one entity and communicating with a roaming relay module, which is executed by an appliance connected to the local network, and is configured to receive via a control interface, complying with a first protocol usable to control the entity from the remote network, at least one first request, and
- receiving from the roaming relay module a second request to be converted into a third request complying with the first protocol.

12. The appliance according to claim 11, the source relay module being configured, when the third request is a request to obtain metadata of contents stored in several contents servers, to aggregate the metadata received from the various contents servers in response to the third request.

13. The appliance according to claim 12, the source relay module being configured to adapt the contents addresses included in the received or aggregated metadata so that these addresses can be interpreted by an appliance of the local network.

14. The appliance according to claim 13, the source relay module comprising functions for detecting a UPnP contents server.

* * * * *

UNITED STATES PATENT AND TRADEMARK OFFICE
CERTIFICATE OF CORRECTION

PATENT NO. : 8,526,352 B2  Page 1 of 1
APPLICATION NO. : 12/827246
DATED : September 3, 2013
INVENTOR(S) : Murphy et al.

It is certified that error appears in the above-identified patent and that said Letters Patent is hereby corrected as shown below:

In the claims:

Claim 1, column 17, line 65, delete the word "source".

Signed and Sealed this
Twenty-ninth Day of September, 2015

Michelle K. Lee
*Director of the United States Patent and Trademark Office*